US012586990B2

(12) United States Patent
Imai et al.

(10) Patent No.: US 12,586,990 B2
(45) Date of Patent: Mar. 24, 2026

(54) DISCHARGE DEVICE

(71) Applicant: Panasonic Intellectual Property Management Co., Ltd., Osaka (JP)

(72) Inventors: Makoto Imai, Shiga (JP); Hidetoshi Hata, Osaka (JP); Yohei Ishigami, Osaka (JP); Takafumi Omori, Shiga (JP); Yuki Takigawa, Shiga (JP); Tetsunori Aono, Tokyo (JP); Yutaka Uratani, Shiga (JP); Mikio Ito, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 147 days.

(21) Appl. No.: 18/566,869

(22) PCT Filed: Apr. 21, 2022

(86) PCT No.: PCT/JP2022/018466
§ 371 (c)(1),
(2) Date: Dec. 4, 2023

(87) PCT Pub. No.: WO2023/007885
PCT Pub. Date: Feb. 2, 2023

(65) Prior Publication Data

US 2024/0266807 A1 Aug. 8, 2024

(30) Foreign Application Priority Data

Jul. 30, 2021 (JP) ................................ 2021-125195

(51) Int. Cl.
*H01T 19/04* (2006.01)

(52) U.S. Cl.
CPC .................................. *H01T 19/04* (2013.01)

(58) Field of Classification Search
CPC ........... H01T 19/04; G01N 9/00; B05B 5/057
See application file for complete search history.

(56) References Cited

U.S. PATENT DOCUMENTS

2020/0353488 A1 11/2020 Ishigami et al.
2022/0344912 A1 10/2022 Ishigami et al.

FOREIGN PATENT DOCUMENTS

JP 2019046635 A * 3/2019 ............ B05B 5/057
TW 202019040 A 5/2020

(Continued)

OTHER PUBLICATIONS

International Search Report received in PCT Application No. PCT/JP2022/018466, dated Jul. 19, 2022.

(Continued)

*Primary Examiner* — Dah-Wei D. Yuan
*Assistant Examiner* — Andrew J Bowman
(74) *Attorney, Agent, or Firm* — Rimon P.C.

(57) ABSTRACT

Discharge device includes voltage application circuit that applies output voltage to load including discharge electrode holding liquid to generate discharge in discharge electrode. Voltage application circuit includes a function of varying a magnitude of output voltage, and a function of switching a discharge period that is a period for varying the magnitude of output voltage to any one of a plurality of periods having different lengths with a lapse of time.

12 Claims, 9 Drawing Sheets

(56) References Cited

FOREIGN PATENT DOCUMENTS

| | | | |
|---|---|---|---|
| TW | 202114476 | A | 4/2021 |
| WO | 2021/059688 | A1 | 4/2021 |

OTHER PUBLICATIONS

The EPC Office Action dated Oct. 25, 2024 for the related European Patent Application No. 22848968.8.

The TW Search Report dated Aug. 25, 2025 for the related TW Patent Application No. 111118524.

* cited by examiner

DISCHARGE DEVICE

CROSS-REFERENCE TO RELATED APPLICATIONS

This application is the U.S. National Phase under 35 U.S.C. § 371 of International Application No. PCT/JP2022/018466, filed on Apr. 21, 2022, which claims the benefit of foreign priority to Japanese Patent Application No. 2021-125195 filed on Jul. 30, 2021, the entire contents of each of which are hereby incorporated by reference.

TECHNICAL FIELD

The present disclosure relates to a discharge device.

BACKGROUND ART

Conventionally, discharge devices each including a discharge electrode and a voltage application circuit are provided.

For example, in a discharge device of Patent Literature 1, the voltage application circuit applies voltage to a load including a discharge electrode that holds a liquid, and generates discharge in the discharge electrode. The voltage application circuit periodically varies a magnitude of the voltage applied to the load at a drive frequency within a predetermined range including a resonance frequency of the liquid, and mechanically vibrates the liquid. Then, a liquid held by the discharge electrode is electrostatically atomized by the discharge. As a result, a charged fine particle liquid containing radicals is generated.

CITATION LIST

Patent Literature

PTL 1: Unexamined Japanese Patent Publication No. 2019-46635

SUMMARY OF THE INVENTION

In the discharge device, a discharge sound is generated when the discharge electrode is discharged. Therefore, a discharge device is required to reduce a discharge sound.

An object of the present disclosure is to provide a discharge device capable of reducing a discharge sound.

A discharge device according to one aspect of the present disclosure includes a voltage application circuit that applies an output voltage to a load including a discharge electrode holding a liquid to generate discharge in the discharge electrode. The voltage application circuit includes a function of varying a magnitude of the output voltage, and a function of switching a discharge period that is a period for varying the magnitude of the output voltage to any one of a plurality of periods having different lengths with a lapse of time.

The present disclosure has an effect of reducing a discharge sound.

DESCRIPTION OF EMBODIMENT

An exemplary embodiment relates generally to a discharge device. More specifically, an exemplary embodiment relates to a discharge device that generates discharge at a discharge electrode that holds a liquid.

Hereinafter, a discharge device according to an exemplary embodiment will be described in detail with reference to the drawings. However, the drawings described in the following exemplary embodiment are merely schematic diagrams, and ratios in size and thickness of components do not always reflect actual dimensional ratios.

In addition, the exemplary embodiment described below is merely an example of an exemplary embodiment of the present disclosure. The present disclosure is not limited to the following exemplary embodiment, and various modifications can be made according to the design and the like as long as the effects of the present disclosure can be achieved.

EXEMPLARY EMBODIMENT

(1) Outline

Figure 1:
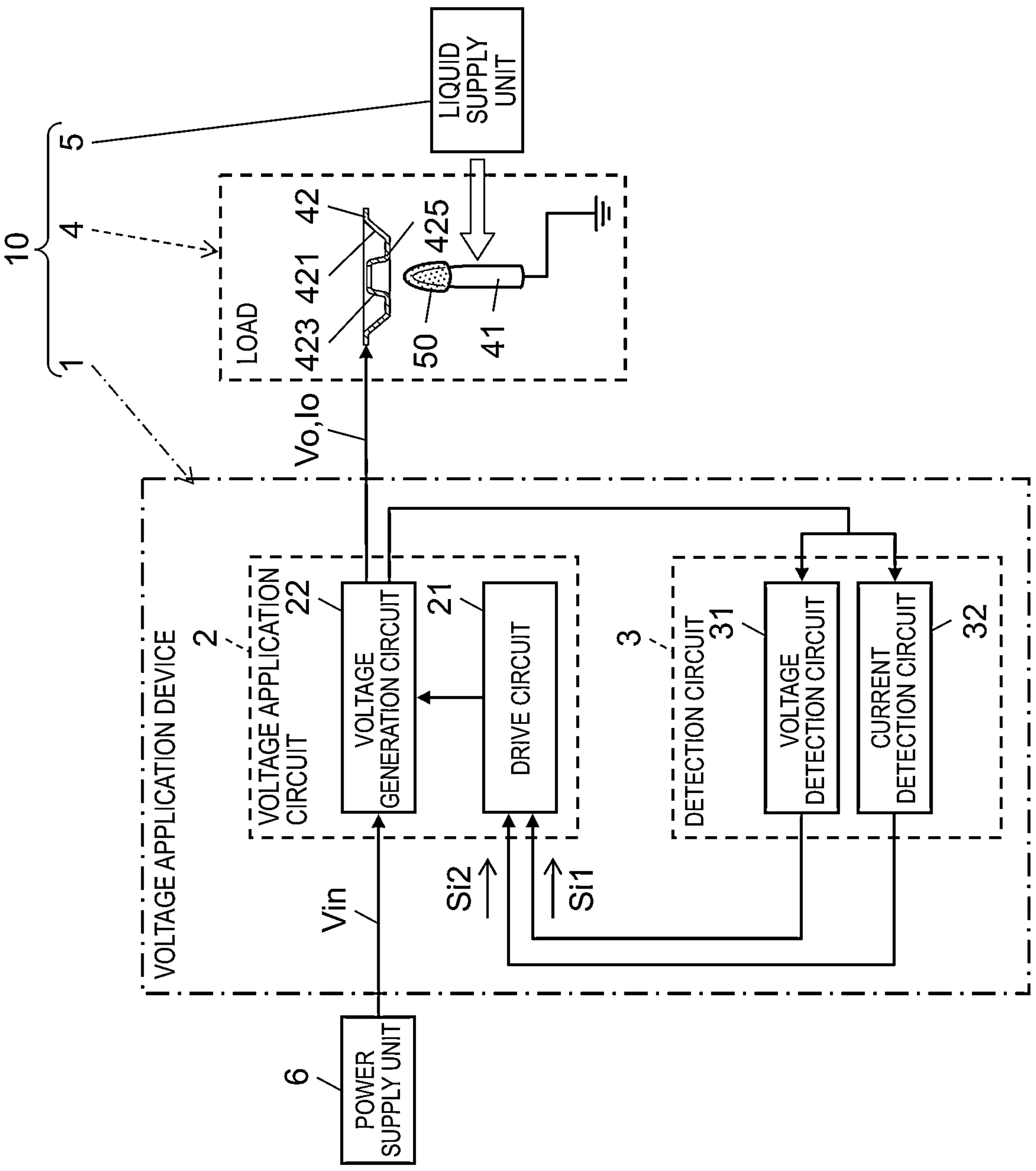
FIG. 1 is a block diagram showing a discharge device according to an exemplary embodiment.

First, an outline of discharge device 10 according to the present exemplary embodiment will be described with reference to FIG. 1. FIG. 1 is a block diagram showing discharge device 10 according to the present exemplary embodiment.

As shown in FIG. 1, discharge device 10 according to the present exemplary embodiment includes voltage application device 1, load 4, and liquid supply unit 5.

Voltage application device 1 is a device that applies voltage Vo for generating discharge to load 4, and includes voltage application circuit 2 and detection circuit 3. That is, discharge device 10 includes voltage application circuit 2. Hereinafter, voltage Vo is referred to as output voltage Vo.

Load 4 includes discharge electrode 41 and counter electrode 42. Counter electrode 42 is an electrode disposed to face discharge electrode 41 with a gap interposed therebetween. That is, discharge electrode 41 is disposed to face counter electrode 42. In load 4, discharge is generated between discharge electrode 41 and counter electrode 42 by applying output voltage Vo between discharge electrode 41 and counter electrode 42.

Liquid supply unit 5 has a function of supplying liquid 50 to discharge electrode 41.

As described above, discharge device 10 according to the present exemplary embodiment includes, as elements, voltage application circuit 2, detection circuit 3, liquid supply unit 5, discharge electrode 41, and counter electrode 42. However, discharge device 10 may include, as minimum elements, discharge electrode 41 and voltage application circuit 2, and each of detection circuit 3, counter electrode 42, liquid supply unit 5, and the like does not have to be included in the components of discharge device 10.

In discharge device 10 according to the present exemplary embodiment, voltage application circuit 2 applies output voltage Vo between discharge electrode 41 and counter electrode 42 in a state where liquid 50 is held by discharge electrode 41. The state in which liquid 50 is held by discharge electrode 41 is, for example, a state in which liquid 50 is attached to the surface of discharge electrode 41. That is, voltage application circuit 2 applies output voltage Vo to load 4 including discharge electrode 41 holding liquid 50. Accordingly, when discharge is generated between discharge electrode 41 and counter electrode 42, liquid 50 held by discharge electrode 41 is electrostatically atomized by the discharge. That is, discharge device 10 according to the present exemplary embodiment constitutes a so-called electrostatic atomization device. In discharge device 10, liquid 50 held by discharge electrode 41 is electrostatically atomized by discharge generated between discharge electrode 41 and counter electrode 42. In the present exemplary embodiment, liquid 50 held by discharge electrode 41, that is, liquid 50 to be electrostatically atomized is also simply referred to as "liquid 50".

Voltage application circuit 2 is electrically connected to discharge electrode 41 and counter electrode 42. Specifically, counter electrode 42 is electrically connected to a positive electrode (plus) of voltage application circuit 2, and discharge electrode 41 is electrically connected to a negative electrode (ground) of voltage application circuit 2. Voltage application circuit 2 applies output voltage Vo between discharge electrode 41 and counter electrode 42.

Voltage application circuit 2 applies output voltage Vo to load 4 (between discharge electrode 41 and counter electrode 42) to generate discharge between discharge electrode 41 and counter electrode 42. Particularly in the present exemplary embodiment, voltage application circuit 2 intermittently generates discharge by periodically varying the magnitude of output voltage Vo. That is, output voltage Vo alternately repeats a period during which output voltage Vo increases and becomes a high voltage and a period during which output voltage Vo decreases and becomes a low voltage, and the magnitude of output voltage Vo periodically varies to cause mechanical vibration in liquid 50. Note that the "high voltage" as used herein may be any voltage set to generate discharge in discharge electrode 41, such as a voltage having a peak of approximately 7.0 kV. However, the voltage value of output voltage Vo is not limited to approximately 7.0 kV, and is appropriately set in accordance with shapes of discharge electrode 41 and counter electrode 42, distance W1 (see FIG. 3B) between discharge electrode 41 and counter electrode 42, or the like, for example. Alternatively, the "low voltage" may be a voltage set so as not to generate discharge in discharge electrode 41, and may be a voltage lower than the above-mentioned "high voltage", and may be either a voltage higher than 0 V or 0 V. Hereinafter, "periodical variations of the magnitude of the output voltage Vo" may be referred to as "periodical variations of output voltage Vo".

Figure 2A:
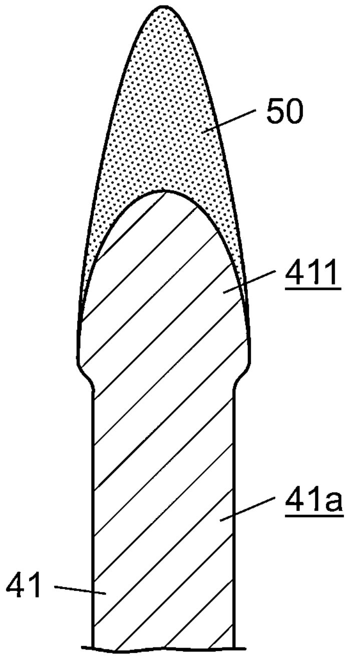
FIG. 2A is a schematic view showing an expanded state of a liquid held by a discharge electrode in the discharge device according to the exemplary embodiment.
Figure 2B:
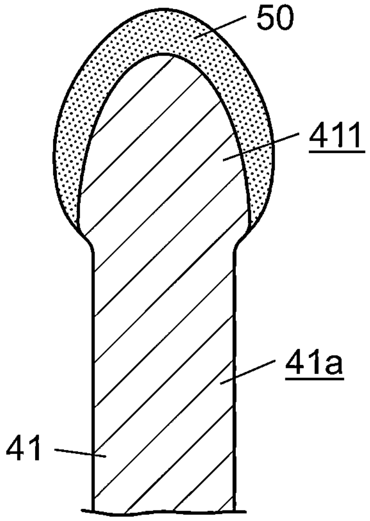
FIG. 2B is a schematic view showing a contracted state of the liquid held by the discharge electrode in the discharge device according to the exemplary embodiment.

FIG. 2A is a schematic view showing an expanded state of liquid 50 held by discharge electrode 41 in discharge device 10. FIG. 2B is a schematic view showing a contracted state of liquid 50 held by discharge electrode 41. Specifically, in a period during which output voltage Vo becomes a high voltage when output voltage Vo is applied to load 4, liquid 50 held by discharge electrode 41 is subjected to a force caused by an electric field to form a conical shape called a Taylor cone as shown in FIG. 2A. Then, the electric field concentrates on a distal end part (apex part) of the Taylor cone, so that discharge occurs. At this time, as the distal end part of the Taylor cone becomes sharper, that is, as an apex angle of the cone becomes smaller (an acute angle), an electric field intensity required for dielectric breakdown becomes smaller, and discharge is likely to be generated. In addition, in a period during which output voltage Vo is low, liquid 50 held by discharge electrode 41 has a substantially spherical shape due to a decrease in the force caused by the electric field as shown in FIG. 2B. Then, as output voltage Vo periodically varies, liquid 50 held by discharge electrode 41 is alternately deformed into a shape shown in FIG. 2A and a shape shown in FIG. 2B along with mechanical vibration. As a result, the Taylor cone as described above is formed periodically. Accordingly, a discharge is intermittently generated at the timing of formation of the Taylor cone as shown in FIG. 2A. Note that, in FIG. 2A and FIG. 2B, dot hatching is applied to liquid 50 so that distal end part 411 and liquid 50 can be easily distinguished.

Then, discharge device 10 generates radicals by generating discharge between discharge electrode 41 and counter electrode 42 of load 4, and electrostatically atomizes liquid 50 held by discharge electrode 41. Further, discharge device 10 generates a nanometer-sized charged fine particle liquid (charged microparticle water) containing radicals in the microdroplets of electrostatically atomized liquid 50. That is, discharge device 10 functions as a charged fine particle liquid generation device. The radicals are the basis for providing useful effects in various situations, besides sterile filtration, odor removal, moisture keeping, freshness keeping, and inactivation of viruses. Hereinafter, radicals, charged fine particle liquids, and the like may be collectively referred to as active components. The active component also includes air ions, which will be described later.

By generating the charged fine particle liquid containing radicals, discharge device 10 described above can prolong the life of the radicals as compared with the case where the radicals alone are released into the air. Moreover, when the charged fine particle liquid has a nanometer size, for example, the charged fine particle liquid can be suspended in a relatively wide range.

In discharge device 10 according to the present exemplary embodiment, voltage application circuit 2 is configured to be capable of switching a function of periodically varying a magnitude of output voltage Vo to be applied to load 4 and a discharge period that is a period for varying the magnitude of output voltage Vo to any of a plurality of periods having different lengths with a lapse of time. That is, discharge device 10 has a function of switching the discharge period with a lapse of time, thereby generating the discharge in a plurality of periods having different lengths. As a result, discharge device 10 can reduce the discharge sound as compared with the case where the discharge period is a single period.

(2) Details

Figure 3A:
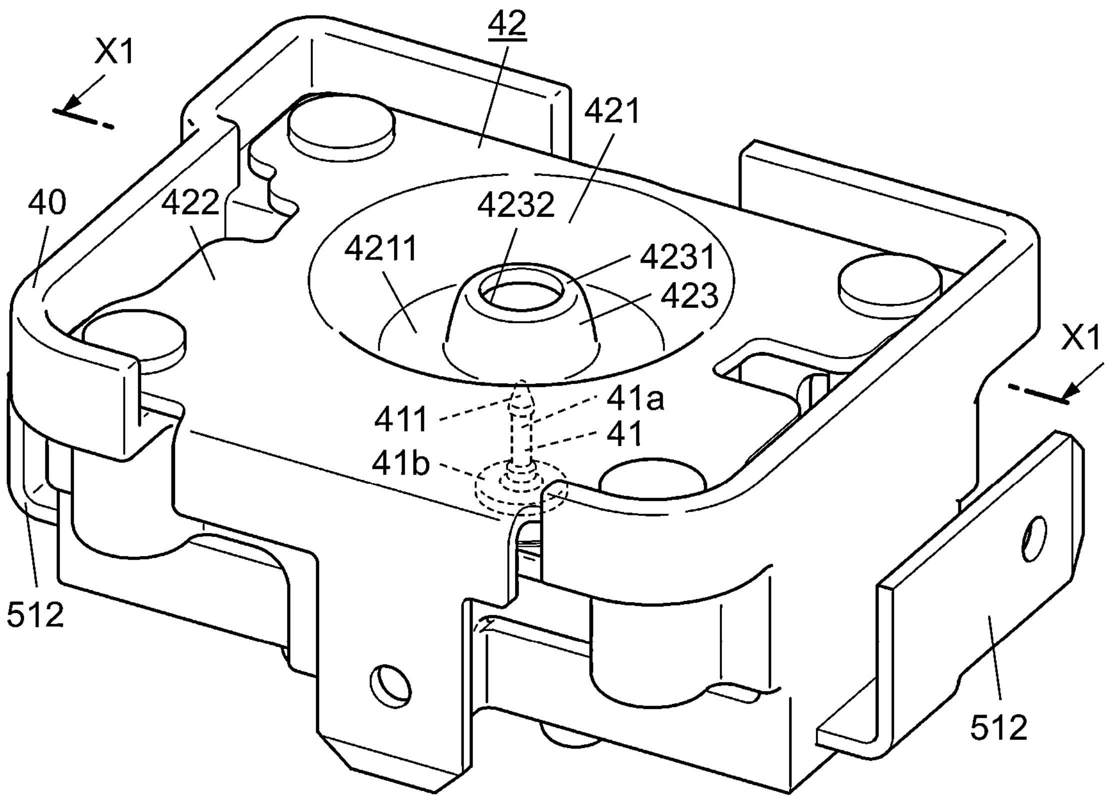
FIG. 3A is a perspective view showing a specific example of the discharge electrode and a counter electrode in the discharge device according to the exemplary embodiment.
Figure 3B:
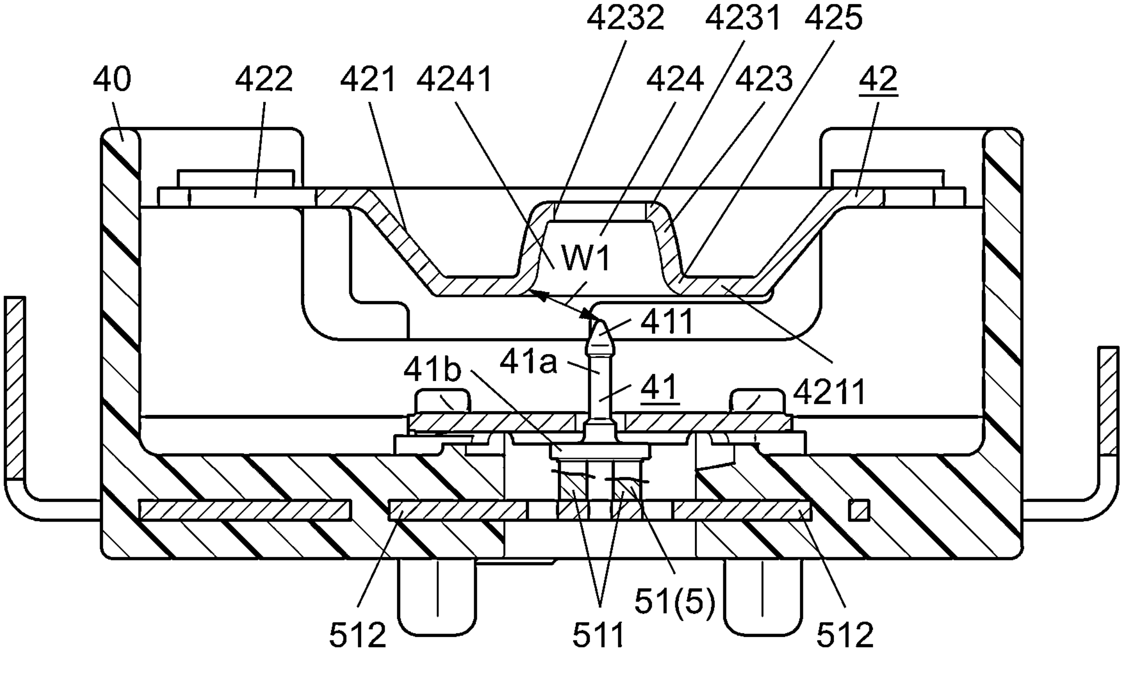
FIG. 3B is a cross-sectional view taken along line X1-X1 of FIG. 3A.
Figure 4:
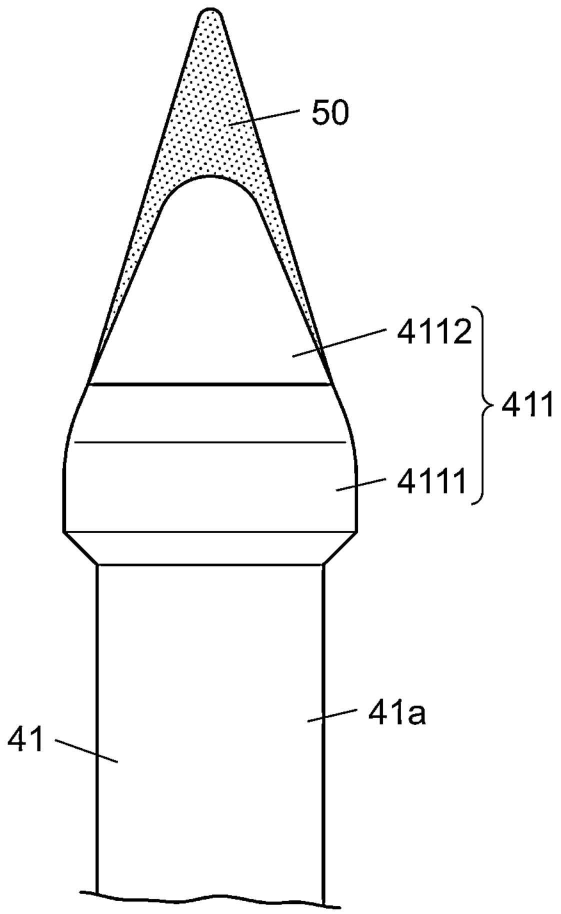
FIG. 4 is a side view showing a distal end shape of the discharge electrode according to the exemplary embodiment.

Hereinafter, details of discharge device 10 according to the present exemplary embodiment will be described with reference to FIGS. 1 to 7. FIG. 3A is a perspective view showing a specific example of discharge electrode 41 and counter electrode 42 in discharge device 10 according to the present exemplary embodiment. FIG. 3B is a cross-sectional view taken along line X1-X1 of FIG. 3A. FIG. 4 is a side view showing a distal end shape of discharge electrode 41.

(2.1) Overall Configuration

As shown in FIG. 1, discharge device 10 according to the present exemplary embodiment includes voltage application device 1, load 4, and liquid supply unit 5. Voltage application device 1 includes voltage application circuit 2 and detection circuit 3. Load 4 includes discharge electrode 41 and counter electrode 42. Liquid supply unit 5 supplies liquid 50 to discharge electrode 41.

(2.1.1) Electrode

As shown in FIG. 3A and FIG. 3B, discharge electrode 41 and counter electrode 42 are held in housing 40 made of a synthetic resin having electrical insulation properties.

(Discharge Electrode)

Discharge electrode 41 is a rod-shaped electrode. Discharge electrode 41 includes shaft part 41*a* and base end part 41*b*. Shaft part 41*a* is formed in a rod shape having a circular cross section, and has distal end part 411 at a first end in the longitudinal direction of shaft part 41*a*. Base end part 41*b* having a flat plate shape is continuously and integrally formed at a second end (an end part opposite to distal end part 411) of shaft part 41*a* in the longitudinal direction. Distal end part 411 has a tapered shape in which the cross-sectional area decreases toward the distal end of shaft part 41*a*. That is, discharge electrode 41 is a needle electrode in which distal end part 411 is formed in a tapered shape. The “tapered shape” as used herein is not limited to a shape in which the distal end is sharply pointed, and includes a shape in which the distal end is rounded as shown in FIG. 2A and FIG. 2B.

The shape of distal end part 411 of discharge electrode 41 will be described with reference to FIG. 4. Note that, in FIG. 4, dot hatching is applied to liquid 50 so that distal end part 411 and liquid 50 can be easily distinguished.

The shape of distal end part 411 of discharge electrode 41 is, for example, a shape including a conical part. A shape of a portion of distal end part 411 facing counter electrode 42 (here, a shape of a distal end of the conical part) is, for example, an R shape. That is, a shape of a portion of distal end part 411 on a side opposite to base end part 41*b* side (see FIG. 3B) is an R shape. The “R shape” in the present disclosure may include a rounded surface (having roundness) of a certain member. The distal end surface of distal end part 411 of the present exemplary embodiment includes a curved surface having a convex roundness. The distal end surface of discharge electrode 41 of the present exemplary embodiment is formed such that a cross-sectional shape including a center axis of discharge electrode 41 has an arc shape continuously connected from the side surface of distal end part 411, and does not include a corner. That is, the entire distal end surface of discharge electrode 41 is a curved surface (bent surface). For example, the shape of distal end part 411 is a hemispherical shape (or substantially hemispherical shape).

Distal end part 411 includes first portion 4111 and second portion 4112. First portion 4111 is a portion of distal end part 411 closer to base end part 41*b* than second portion 4112, and has a columnar shape that is flat in the axial direction of discharge electrode 41. Second portion 4112 is a portion of distal end part 411 farther from base end part 41*b* than first portion 4111, and has a conical shape. In short, distal end part 411 has first portion 4111 corresponding to a cylindrical part and second portion 4112 corresponding to a conical part.

In addition, by applying a voltage between discharge electrode 41 and counter electrode 42, liquid 50 held by discharge electrode 41 receives force generated by the electric field and forms a conical shape called a Taylor cone as shown in FIG. 4. As shown in FIG. 4, the shape of the Taylor cone is a conical shape along the conical part of distal end part 411 of discharge electrode 41. Second portion 4112 of distal end part 411 of discharge electrode 41 enters Taylor cone shaped liquid 50. That is, in discharge device 10 according to the present exemplary embodiment, second portion 4112 constitutes a part of distal end part 411 entering Taylor cone shaped liquid 50.

(Counter Electrode)

As shown in FIG. 3A and FIG. 3B, counter electrode 42 is disposed to face distal end part 411 of discharge electrode 41. Counter electrode 42 includes, for example, a flat plate-shaped support 422, and first recess 421 is provided substantially at the center of support 422. First recess 421 is formed in a truncated cone shape by recessing substantially the center of support 422 toward discharge electrode 41. Protrusion 423 is integrally formed at a central portion of bottom wall 4211 of first recess 421. Protrusion 423 is formed in a truncated cone shape (dome shape) by protruding a part of bottom wall 4211 of first recess 421 to an opposite side of discharge electrode 41. In other words, second recess 424 having a truncated cone shape is formed in bottom wall 4211 by recessing the central portion of bottom wall 4211 in the direction opposite to discharge electrode 41.

The direction in which first recess 421 is concaved (the direction in which first recess 421 is recessed) and the direction in which protrusion 423 protrudes (the direction in which second recess 424 is recessed) are opposite directions. Opening part 4232 having a circular shape is formed in the central portion of top wall 4231 (bottom wall 4231 of second recess 424) of protrusion 423. Opening part 4232 penetrates top wall 4231 in a thickness direction of top wall 4231.

Counter electrode 42 described above includes truncated cone-shaped first recess 421 concaved toward discharge electrode 41, truncated cone-shaped protrusion 423 protruding in a direction away from discharge electrode 41 on bottom surface 4211 of first recess 421, and opening part 4232 formed in top wall 4231 of protrusion 423.

Here, a thickness direction of counter electrode 42 (a penetrating direction of opening part 4232) accords with a longitudinal direction of discharge electrode 41. In planar view (as viewed from the thickness direction of counter electrode 42), distal end part 411 of discharge electrode 41 is located near the center of opening part 4232 of counter electrode 42. In addition, distal end part 411 of discharge electrode 41 is located outside second recess 424 of counter electrode 42, and is located closer to base end part 41*b* of discharge electrode 41 than bottom wall 4211 of first recess 421 is. That is, a gap (space) is secured between counter electrode 42 and discharge electrode 41 by at least opening 4241 of second recess 424 of counter electrode 42. In other words, counter electrode 42 is disposed so as to face discharge electrode 41 with a gap interposed therebetween, and is spatially separated from discharge electrode 41.

Protrusion 423 (second recess 424) of counter electrode 42 described above faces discharge electrode 41, and is formed to have a shape of an axis target with respect to shaft part 41*a* of discharge electrode 41 in plan view. A peripheral edge of opening 4241 of second recess 424 (a peripheral edge of opening 4241 facing opening part 4232 in protrusion 423) is edge 425 having an annular shape constituting a boundary portion between bottom wall 4211 and protrusion 423. In plan view, distal end part 411 of discharge electrode 41 is located at the center of edge 425 having the annular shape. That is, distance W1 (see FIG. 3B) between edge 425 having the annular shape and distal end part 411 is equal over the entire circumference of edge 425.

(2.1.2) Liquid Supply Unit

Liquid supply unit 5 supplies liquid 50 for electrostatic atomization to discharge electrode 41. As an example, liquid supply unit 5 is realized by using cooling device 51 shown in FIG. 3B. Cooling device 51 cools discharge electrode 41 to generate dew condensation water as liquid 50 at discharge electrode 41. Specifically, cooling device 51 includes a pair of Peltier elements 511 and a pair of radiator plates 512. The pair of Peltier elements 511 are held by the pair of radiator plates 512. Cooling device 51 cools discharge electrode 41 by energizing the pair of Peltier elements 511. A part of each of the pair of radiator plates 512 is embedded in housing 40, and thus, the pair of radiator plates 512 are held in housing 40. At least a portion holding Peltier element 511 in each of the pair of heat radiator plates 512 is exposed from housing 40.

The pair of Peltier elements 511 are mechanically and electrically connected to base end part 41*b* of discharge electrode 41 by soldering, for example. In addition, the pair of Peltier elements 511 are mechanically and electrically connected to the pair of radiator plates 512 by, for example, soldering. The energization of the pair of Peltier elements 511 is performed through the pair of heat radiator plates 512 and discharge electrode 41. Therefore, cooling device 51 constituting liquid supply unit 5 cools entire discharge electrode 41 through base end part 41*b*. Accordingly, moisture in the air condenses and adheres to the surface of discharge electrode 41 as dew condensation water. This dew condensation water is held as liquid 50 by discharge electrode 41. That is, liquid supply unit 5 is configured to cool discharge electrode 41, and generate dew condensation water as liquid 50 on the surface of discharge electrode 41. In this configuration, since liquid supply unit 5 can supply liquid 50 (dew condensation water) to discharge electrode 41 by using moisture in the air, supply and replenishment of the liquid to discharge device 10 become unnecessary.

(2.1.3) Voltage Application Circuit and Detection Circuit

As shown in FIG. 1, voltage application circuit 2 includes drive circuit 21 and voltage generation circuit 22. Drive circuit 21 is a circuit that drives voltage generation circuit 22. Voltage generation circuit 22 is a circuit that receives power from power supply unit 6 and generates output voltage Vo as a voltage to be applied to load 4. Power supply unit 6 is a power supply circuit that generates a DC voltage of approximately several V to a dozen of V. In the present exemplary embodiment, it is assumed that power supply unit 6 is not included in the elements of voltage application device 1. However, power supply unit 6 may be included in the elements of voltage application device 1. Voltage application circuit 2 generates output voltage Vo by periodically stepping up input voltage Vin from power supply unit 6, and applies output voltage Vo to load 4.

Voltage application circuit 2 is electrically connected to load 4 (discharge electrode 41 and counter electrode 42). Voltage application circuit 2 applies periodically varying output voltage Vo to load 4. Voltage application circuit 2 is configured to apply output voltage Vo between discharge electrode 41 and counter electrode 42 while designating discharge electrode 41 as a negative electrode (ground) and counter electrode 42 as a positive electrode (plus). When voltage application circuit 2 applies output voltage Vo to load 4, a potential difference is produced between discharge electrode 41 and counter electrode 42 in such a way that counter electrode 42 has a high potential and discharge electrode 41 has a low potential.

Then, voltage application circuit 2 operates in at least one operation mode of the first mode and the second mode. The first mode is a mode of increasing output voltage Vo with a lapse of time, causing discharge to develop into dielectric breakdown, and generating output current Io (discharge current). The second mode is a mode for cutting off output current Io in order to terminate the discharge. That is, voltage application circuit 2 has, as the operation modes, the first mode and the second mode. Specifically, drive circuit 21 drives voltage generation circuit 22 in one of the first mode and the second mode.

The detection circuit 3 detects the magnitudes of output voltage Vo and output current Io. Voltage application circuit 2 alternately repeats the first mode and the second mode as the operation modes based on the detection result of detection circuit 3 during the driving period in which voltage application device 1 is driven.

Accordingly, the magnitude of an electric energy acting on liquid 50 held by discharge electrode 41 periodically varies, and as a result, liquid 50 held by discharge electrode 41 mechanically vibrates in a period of varying output voltage Vo.

In the present exemplary embodiment, voltage application circuit 2 operates based on a monitoring target of detection circuit 3. The "monitoring target" as used herein includes output current Io and output voltage Vo of voltage application circuit 2. Note that the "monitoring target" may include at least one of output current Io and output voltage Vo of voltage application circuit 2.

As shown in FIG. 1, detection circuit 3 includes voltage detection circuit 31 and current detection circuit 32. Voltage detection circuit 31 monitors output voltage Vo of voltage application circuit 2 as the monitoring target, and detects a magnitude (voltage value) of output voltage Vo. Then, voltage detection circuit 31 outputs voltage detection signal Si1 including data of the magnitude of output voltage Vo to drive circuit 21 of voltage application circuit 2. Current detection circuit 32 monitors output current Io of voltage application circuit 2 as the monitoring target, and detects a magnitude (current value) of output current Io. Then, current detection circuit 32 outputs current detection signal Si2 including data of the magnitude of output current Io to drive circuit 21 of voltage application circuit 2. Drive circuit 21 drives voltage generation circuit 22 on the basis of voltage detection signal Si1 and current detection signal Si2, and controls output voltage Vo. That is, detection circuit 3 monitors, as the monitoring target, both output current Io and output voltage Vo of voltage application circuit 2. Detection circuit 3 may also monitor, as the monitoring target, one of output current Io and output voltage Vo of voltage application circuit 2.

Note that, since there is a correlation between output voltage Vo (secondary-side voltage) of voltage application circuit 2 and input voltage Vin (primary-side voltage) of voltage application circuit 2, voltage detection circuit 31 may indirectly detect output voltage Vo from input voltage Vin. Similarly, since there is a correlation between output current Io (secondary-side current) of voltage application circuit 2 and an input current (primary-side current) of voltage application circuit 2, current detection circuit 32 may indirectly detect output current Io from the input current.

Voltage application circuit 2 is configured to operate in the first mode when the magnitude of the monitoring target is less than a threshold, and operate in the second mode when the magnitude of the monitoring target is more than or equal to the threshold. First, when voltage application circuit 2 operates in the first mode and output voltage Vo increases with a lapse of time, corona discharge is started in discharge electrode 41 due to local dielectric breakdown, and output current Io is generated. When the magnitude of the monitoring target reaches the threshold, voltage application circuit 2 operates in the second mode, output voltage Vo decreases, and the potential difference between discharge electrode 41 and counter electrode 42 decreases, so that output current Io is cut off. That is, voltage application circuit 2 causes output current Io to disappear (fade away) by lowering output voltage Vo after load 4 is discharged. Then, voltage application circuit 2 operates again in the first mode, and repeats the above operation. Note that voltage application circuit 2 may switch the operation mode from the first mode to the second mode when a certain period of time elapses after load 4 is discharged.

Specifically, when output voltage Vo is less than voltage threshold Vs1 (see FIG. 6A) and output current Io is less than current threshold Is1 (see FIG. 6A), voltage application circuit 2 operates in the first mode to increase output voltage Vo with a lapse of time. When output current Io becomes larger than or equal to current threshold Is1 (see FIG. 6A) during the operation in the first mode, voltage application circuit 2 switches the operation mode from the first mode to the second mode to terminate the discharge. Note that, in FIG. 6A, voltage application circuit 2 switches the operation mode from the first mode to the second mode when a certain period of time elapses after output current Io becomes larger than or equal to current threshold Is1.

As described above, voltage application circuit 2 operates to alternately repeat the first mode and the second mode during the drive period, and periodically varies the magnitude of output voltage Vo applied between discharge electrode 41 and counter electrode 42. Voltage application circuit 2 first sets the operation mode to the first mode, and generates local corona discharge at distal end part 411 of discharge electrode 41 holding liquid 50. When the discharge is started, voltage application circuit 2 sets the operation mode to the second mode and terminates the discharge. As a result, in discharge electrode 41, the discharge is intermittently repeated.

Note that specific circuit configurations of drive circuit 21 and voltage generation circuit 22 (step-up circuit B1) will be described in the section of "(2.2) Circuit configuration" below.

(2.2) Circuit Configuration

Figure 5:
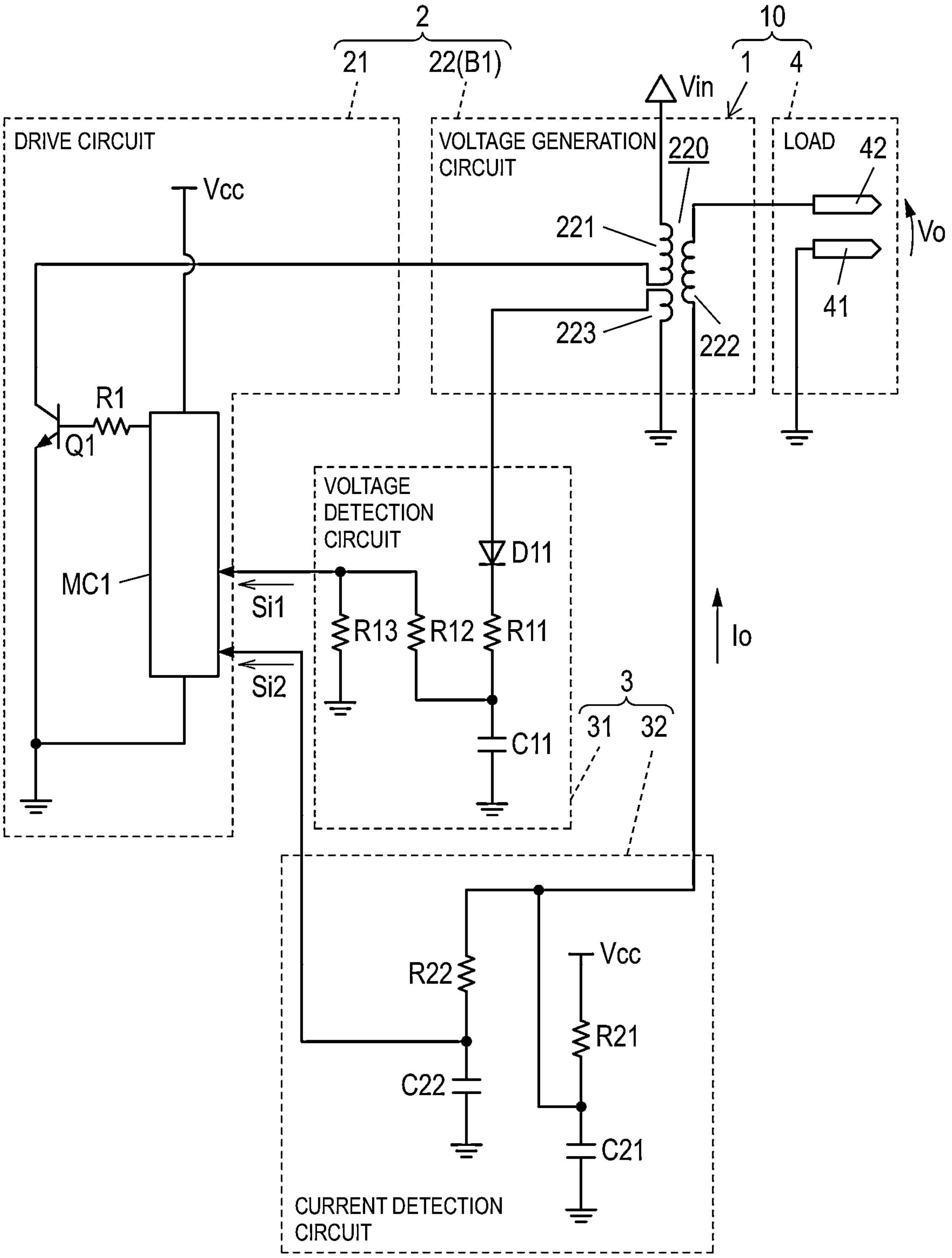
FIG. 5 is a circuit diagram showing an example of the discharge device according to the exemplary embodiment.

Next, a specific circuit configuration of voltage application device 1 is described with reference to FIG. 5. FIG. 5 is a circuit diagram schematically showing an example of a circuit configuration of discharge device 10. Note that the illustration of power supply unit 6 is omitted in FIG. 5.

Voltage application circuit 2 includes drive circuit 21 and voltage generation circuit 22 as described above. In the example of FIG. 5, voltage application circuit 2 is an isolated DC/DC converter and includes step-up circuit B1. Step-up circuit B1 periodically steps up DC input voltage Vin (for example, 13.8 V) from power supply unit 6 and outputs as the output voltage Vo. Here, voltage generation circuit 22 functions as step-up circuit B1. Output voltage Vo is applied to load 4 (discharge electrode 41 and counter electrode 42) as the applied voltage. That is, voltage application circuit 2 periodically generates discharge electrode 41 to discharge by applying periodically varying output voltage Vo to load 4.

Voltage generation circuit 22 (step-up circuit B1) includes isolation transformer 220. Isolation transformer 220 includes primary winding 221, secondary winding 222, and auxiliary winding 223. Primary winding 221 and auxiliary winding 223 are electrically insulated from secondary winding 222, and are magnetically coupled. The first end of secondary winding 222 is electrically connected to counter electrode 42. That is, step-up circuit B1 includes isolation transformer 220 that steps up input voltage Vin input to a primary side (to primary winding 221) and outputs output voltage Vo from a secondary side (from secondary winding 222) electrically connected to load 4.

Drive circuit 21 includes transistor Q1, and is configured to supply a power to primary winding 221 of isolation transformer 220 on the basis of a switching operation of transistor Q1. Drive circuit 21 includes a microcomputer MC1 that drives transistor Q1 in addition to transistor Q1. Transistors Q1 is, for example, an npn bipolar transistor.

A collector of transistor Q1 is connected to primary winding 221, and an emitter of transistor Q1 is connected to the ground. Input voltage Vin is applied to a series circuit of primary winding 221 and transistor Q1 from power supply unit 6. The base of transistor Q1 is connected to the output port of microcomputer MC1 via resistor R1. The control power supply generates control voltage Vcc (for example, 5 V), and applies control voltage Vcc to drive circuit 21.

With the above configuration, voltage application circuit 2 constitutes a separately-excited converter. That is, transistor Q1 is repeatedly turned on and off by microcomputer MC1, and a pulsed voltage is generated in primary winding 221. As a result, a high voltage is induced in secondary winding 222 of isolation transformer 220, and the high voltage induced in secondary winding 222 is applied to load 4 via discharge electrode 41 and counter electrode 42. By these operations, voltage application circuit 2 generates output voltage Vo obtained by periodically stepping up input voltage Vin, and applies output voltage Vo to load 4.

Detection circuit 3 includes voltage detection circuit 31 and current detection circuit 32, both of which are shown in FIG. 5.

Voltage detection circuit 31 includes diode D11, resistors R11 to R13, and capacitor C11. An anode of diode D11 is connected to the first end of auxiliary winding 223. The second end of auxiliary winding 223 is connected to the ground. A cathode of diode D11 is connected to the first end of capacitor C11 with resistor R11 interposed therebetween. The second end of capacitor C11 is connected to the ground. Moreover, the first end of capacitor C11 is connected to an input port of microcomputer MC1 via resistor R12, and is connected to the ground via a series circuit of resistors R12, R13.

With the above configuration, voltage detection circuit 31 indirectly monitors output voltage Vo of voltage application circuit 2 (the induced voltage of secondary winding 222) as the monitoring target by monitoring an induced voltage of auxiliary winding 223. Specifically, capacitor C11 is charged by the induced voltage of auxiliary winding 223 via diode D11 and resistor R11. The voltage of capacitor C11 divided by resistors R12, R13 is input to the input port of microcomputer MC1 as voltage detection signal Si1. When output voltage Vo increases, voltage detection signal Si1 increases. When output voltage Vo decreases, voltage detection signal Si1 decreases.

Current detection circuit 32 includes resistors R21, R22, and capacitors C21, C22. Control voltage Vcc is applied to the first end of resistor R21, and the first end of capacitor C21 is connected to the second end of resistor R21. The second end of capacitor C21 is connected to the ground. The second end of secondary winding 222 of isolation transformer 220 is connected to a connection point between resistor R21 and capacitor C21. The second end of secondary winding 222 is an end opposite to the first end of secondary winding 222 to which counter electrode 42 is connected. That is, control voltage Vcc is applied to counter electrode 42 via resistor R21 and secondary winding 222. In addition, the second end of secondary winding 222 is connected to the ground via a series circuit of resistor R22 and capacitor C22. Then, the voltage of capacitor C22 is input to an input port of microcomputer MC1 as current detection signal Si2. When output current Io increases, current detection signal Si2 increases. When output current Io decreases, current detection signal Si2 decreases.

Microcomputer MC1 monitors output voltage Vo on the basis of voltage detection signal Si1 and monitors output current Io on the basis of current detection signal Si2. Then, when output voltage Vo is less than the voltage threshold (see Vs1 in FIG. 6A) and output current Io is less than the current threshold (see Is1 in FIG. 6A), microcomputer MC1 sets the operation mode to the first mode, and turns on and off transistor Q1. When output current Io becomes larger than or equal to the current threshold during the operation in the first mode, microcomputer MC1 sets the operation mode to the second mode, stops the on and off driving of transistor Q1, and maintains transistor Q1 in the off state. Note that, in FIG. 6A, the operation mode is set to the second mode at a point in time when a certain period of time elapses after output current Io becomes larger than or equal to current threshold Is1, the on and off driving of transistor Q1 is stopped, and transistor Q1 is maintained in the off state. In addition, when output voltage Vo becomes larger than or equal to the voltage threshold (see Vs1 in FIG. 6A) during the operation in the first mode, microcomputer MC1 sets the operation mode to the second mode after a predetermined time elapses, stops the on and off driving of transistor Q1, and maintains transistor Q1 in the off state.

(2.3) Discharge Control

Figure 6A:
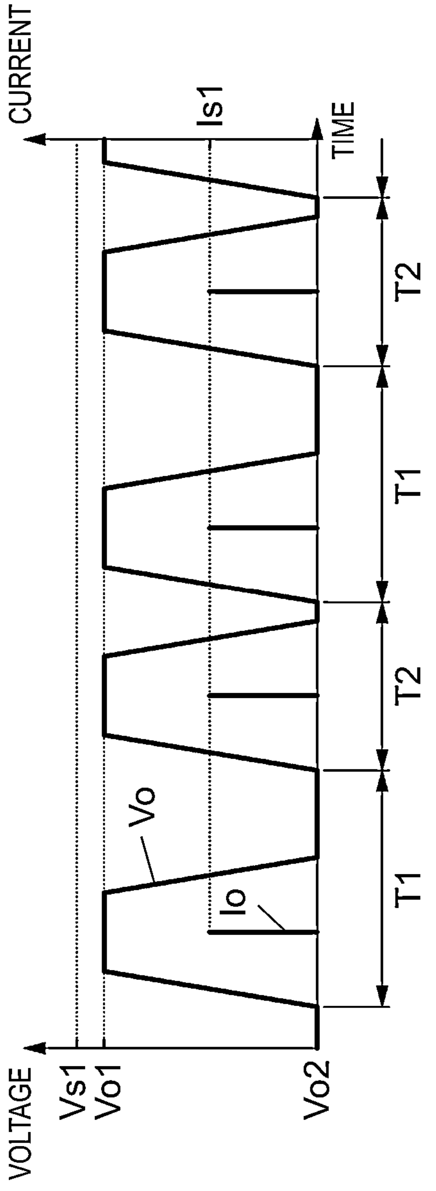
FIG. 6A is a graph schematically showing an output of the discharge device according to the exemplary embodiment.

FIG. 6A shows discharge control by voltage application circuit 2 of the present exemplary embodiment. FIG. 6A shows a waveform of output voltage Vo and a waveform of output current Io. Note that, in FIG. 6A, the horizontal axis represents time, the left vertical axis represents voltage, and the right vertical axis represents current.

When voltage application circuit 2 periodically varies output voltage Vo, discharge is periodically generated between discharge electrode 41 and counter electrode 42. In load 4, discharge is generated between discharge electrode 41 and counter electrode 42 due to the potential difference between discharge electrode 41 and counter electrode 42. Then, radicals are generated by discharge generated between discharge electrode 41 and counter electrode 42 of load 4, and liquid 50 held by discharge electrode 41 is electrostatically atomized. Further, discharge device 10 generates a nanometer-sized charged fine particle liquid containing radicals in the microdroplets of electrostatically atomized liquid 50. The produced charged fine particle liquid is released to a periphery of discharge device 10 via, for example, opening part 4232 of counter electrode 42.

Assuming that a period in which voltage application circuit 2 changes output voltage Vo is a discharge period, in each discharge period, voltage application circuit 2 first operates in the first mode to increase output voltage Vo from minimum value Vo2 to maximum value Vo1. Then, when output voltage Vo reaches maximum value Vo1, voltage application circuit 2 maintains output voltage Vo at maximum value Vo1. At this time, when output voltage Vo increases from minimum value Vo2, local dielectric breakdown occurs at the distal end of liquid 50 held by the discharge electrode 41, and minute discharge by corona discharge starts. Thereafter, output voltage Vo further increases to reach maximum value Vo1, and output current Io flows.

When output current Io becomes larger than or equal to current threshold Is1 during the operation in the first mode, voltage application circuit 2 switches the operation mode from the first mode to the second mode, and lowers output voltage Vo to terminate the discharge. Note that, in FIG. 6A, the operation mode is switched from the first mode to the second mode when a certain period of time elapses after output current Io becomes larger than or equal to current threshold Is1, and output voltage Vo is lowered to terminate the discharge. That is, the waveform of output voltage Vo is trapezoidal.

In addition, when output voltage Vo becomes larger than or equal to voltage threshold Vs1 while voltage application circuit 2 is operating in the first mode, voltage application circuit 2 sets the operation mode to the second mode after a predetermined time elapses, switches the operation mode from the first mode to the second mode, and lowers output voltage Vo to terminate the discharge.

As described above, output voltage Vo alternately repeats maximum value Vo1 and minimum value Vo2, and periodically varies in the discharge period. That is, the magnitude of output voltage Vo varies within a range exceeding 0 V during the drive period. Maximum value Vo1 of output voltage Vo corresponds to a discharge voltage that generates discharge. Minimum value Vo2 of output voltage Vo is higher than 0 V and lower than maximum value Vo1. Maximum value Vo1 is, for example, about 7.0 kV. Minimum value Vo2 only needs to be a voltage set so that discharge is not generated in discharge electrode 41, and is a voltage higher than 0 V and lower than maximum value Vo1.

In FIG. 6A, when output voltage Vo increases from minimum value Vo2 to maximum value Vo1, output voltage Vo increases substantially linearly with a lapse of time. When output voltage Vo decreases from maximum value Vo1 to minimum value Vo2, output voltage Vo decreases substantially linearly with a lapse of time. Note that output voltage Vo may increase or decrease non-linearly with a lapse of time.

Then, voltage application circuit 2 switches the discharge period, which is a period in which output voltage Vo is varied, to either first period T1 or second period T2 with a lapse of time. Specifically, as shown in FIG. 6A, voltage application circuit 2 alternately switches the discharge period between first period T1 and second period T2 in every one period of the discharge period. Voltage application circuit 2 varies the magnitude of output voltage Vo during first period T1, and varies the magnitude of output voltage Vo during second period T2 subsequent to first period T1. First period T1 and second period T2 are discharge periods having lengths different from each other. For example, first period T1 is 2.2 msec (frequency 455 Hz), and second period T2 is 1.8 msec (frequency 555 Hz). For example, first period T1 and second period T2 are programmed to be alternately repeated as periods of a series of operation modes of the first mode and the second mode. Voltage application circuit 2 (more specifically, microcomputer MC1) executes this program to alternately switch first period T1 and second period T2. That is, voltage application circuit 2 uses two periods of first period T1 and second period T2 as the discharge period. First period T1 and second period T2 as the discharge period are set so as to be close to the resonant period of liquid 50 held by discharge electrode 41. The resonant period of liquid 50 is a period in which the amplitude of the vibration of liquid 50 caused by the variation of output voltage Vo is maximized.

The resonant period of liquid 50 depends on a volume (amount) of liquid 50 and is expressed by [1/a·V−0.5]. "V" is a volume of liquid 50 held by discharge electrode 41. "a" is a coefficient of proportionality depending on a surface tension, a viscosity, and the like of liquid 50 held by discharge electrode 41.

For example, if the volume of the Taylor cone is 0.0917 $mm^3$ and the volume of second portion 4112 of distal end part 411 is 0.0650 $mm^3$, the volume of liquid 50 forming the Taylor cone is 0.076 μL, and at this time, the resonant period of liquid 50 is 0.33 msec. In the present exemplary embodiment, the volume of liquid 50 forming the Taylor cone is 0.46 μL, and the resonant period of liquid 50 is 2 ms.

(2.4) Improvement of Discharge Sound

Hereinafter, improvement of the discharge sound in discharge device 10 according to the present exemplary embodiment will be described with reference to FIG. 6A, FIG. 6B, and FIG. 7.

As described above, the applied voltage to load 4, that is, the magnitude of output voltage Vo is periodically varied in the discharge period, and thus, the magnitude of the electric energy acting on liquid 50 held by discharge electrode 41 periodically varies. As a result, liquid 50 mechanically vibrates in the discharge period. When the discharge period is set to the resonant period (the reciprocal of the resonance frequency) or the vicinity of the resonant period of liquid 50, the amplitude of the mechanical vibration of liquid 50 caused by the variation in the magnitude of output voltage Vo becomes relatively large. As the amplitude of liquid 50 increases, the distal end part of Taylor cone shaped liquid 50 (see FIG. 4) has a pointed (sharper) shape, and discharging is facilitated.

However, discharge device 10 generates a discharge sound due to mechanical vibration of liquid 50. The larger the amplitude of the vibration of liquid 50 is, the larger the sound pressure of the discharge sound is. When the energy acting on liquid 50 is suppressed, the discharge sound is reduced, but active components such as radicals and charged fine particle liquid generated by discharge device 10 are also reduced. Further, it is required to reduce a discharge sound while suppressing a decrease in an amount of active components generated.

Therefore, as shown in FIG. 6A, voltage application circuit 2 of discharge device 10 switches the discharge period, which is a period in which output voltage Vo is varied, to either first period T1 or second period T2 with a lapse of time. In the present exemplary embodiment, voltage application circuit 2 uses two periods of first period T1 and second period T2 as the discharge period, and switches the discharge period alternately, to T1→T2→T1→T2, and so on in every one period of the discharge period. Therefore, the discharge sound of discharge device 10 mainly includes the sound component of first period T1 and the sound component of second period T2.

Here, the average of first period T1 and second period T2 is preferably included in a predetermined range including the resonant period of liquid 50. In this case, the predetermined range including the resonant period of liquid 50 may be any range, as long as the amount of the active component generated by discharge device 10 can be sufficiently secured. As a result, the amount of the active component generated by discharge device 10 can be made substantially equal to the amount of the active component generated by a comparative example shown in FIG. 6B, which will be described later, and the decrease in the active component generated by discharge device 10 can be suppressed. Specifically, first period T1 is set to 2.2 msec (frequency 455 Hz), and second period T2 is set to 1.8 msec (frequency 555 Hz) with respect to the resonant period of 2 msec (frequency 500 Hz) of liquid 50. That is, the average of first period T1 and second period T2 is equal to the resonant period of liquid 50. Note that the closer the average of first period T1 and second period T2 is to the resonant period of liquid 50, the larger the amount of the active component generated by discharge device 10 can be.

Figure 6B:
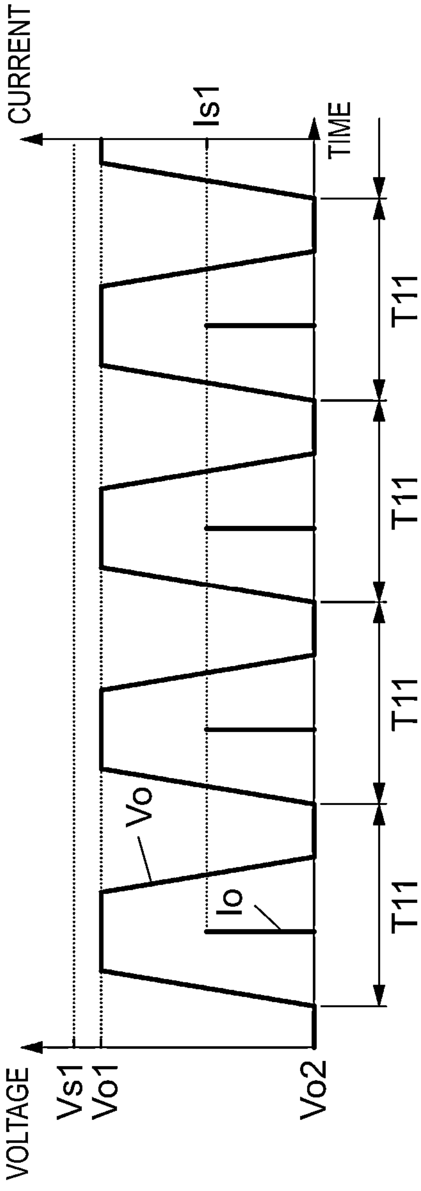
FIG. 6B is a graph schematically showing an output of a discharge device according to a comparative example.

On the other hand, FIG. 6B shows a discharge mode of the comparative example. FIG. 6B is a graph schematically showing an output of a discharge device according to the comparative example. In the comparative example, only one period T11 is used as the discharge period. Here, the period T11 is set to resonant period 2 msec (frequency 500 Hz) of liquid 50. Therefore, the discharge sound of discharge device 10 mainly includes the sound component of period T11.

Figure 7:
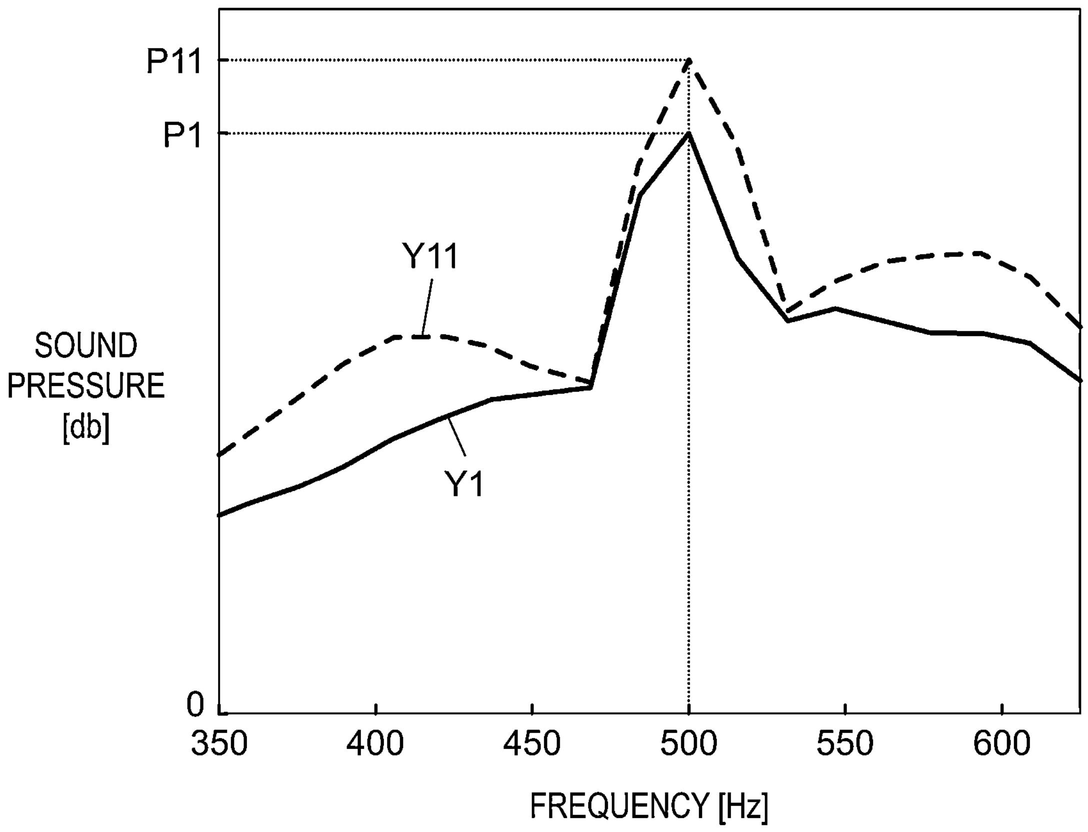
FIG. 7 is a graph showing frequency characteristics of a discharge sound of the discharge device according to the exemplary embodiment and the discharge device according to the comparative example.

FIG. 7 is a graph showing frequency characteristics of a discharge sound of discharge device 10 according to the present exemplary embodiment and the discharge device according to the comparative example. FIG. 7 is a graph in which the horizontal axis represents the frequency and the vertical axis represents the sound pressure (magnitude) of the discharge sound, and shows characteristics Y1, Y11. Characteristic Y1 is a frequency characteristic of a discharge sound generated by discharge device 10 operating in the discharge mode in FIG. 6A. Characteristic Y11 is a frequency characteristic of a discharge sound generated by the comparative example operating in the discharge mode in FIG. 6B.

In characteristic Y1, the sound pressure becomes maximum value (peak value) P1 at a frequency of 500 Hz (period 2 msec) corresponding to the average of first period T1 and second period T2. In characteristic Y11, the sound pressure becomes maximum value (peak value) P11 at a frequency of 500 Hz (period 2 msec) corresponding to period T11. Maximum value P1 of the sound pressure of characteristic Y1 is smaller than maximum value P11 of the sound pressure of characteristic Y11, and the discharge sound of discharge device 10 is smaller than the discharge sound of the comparative example. In FIG. 7, the maximum value P1 of the sound pressure of characteristic Y1 is reduced by about 4 dB to 5 dB (reduced by about 40%) from maximum value P11 of the sound pressure of characteristic Y11. That is, discharge device 10 can reduce the discharge sound as compared with the comparative example.

In the above description, each of first period T1 and second period T2 is selected from the vicinity of the resonant period of liquid 50 held by discharge electrode 41, and the amount of the active component generated by discharge device 10 can be made substantially the same as the amount of the active component generated by the comparative example. However, when first period T1 is set to 0.5 msec and second period T2 is set to 3.5 msec, the average of first period T1 and second period T2 is set to 2 msec which is the same as the resonant period, but the amount of the active component generated by discharge device 10 is greatly reduced as compared with the comparative example. This is because each of first period T1 and second period T2 is too far from the resonant period. Therefore, each of first period T1 and second period T2 is preferably not too far from the resonant period. That is, first period T1 and second period T2 as the discharge period are preferably set to be close to the resonant period.

Specifically, each of first period T1 and second period T2 is preferably less than or equal to a first value, which is a value obtained by adding a half value of the resonant period to the resonant period, and larger than or equal to a second value, which is a value obtained by subtracting the half value from the resonant period. For example, when the resonant period is 2 msec, the half value of the resonant period is 1 msec. In this case, first value is 3 msec (=2 msec+1 msec), and second value is 1 msec (=2 msec−1 msec). That is, each of first period T1 and second period T2 is selected from a range from 1 msec or more to 3 msec or less. As a result, a decrease in active components generated by discharge device 10 can be further suppressed.

(3) First Modification

Voltage application circuit 2 preferably switches the discharge period to any one of the plurality of periods every time the discharge period is repeated a predetermined number of times.

In the above-described exemplary embodiment, voltage application circuit 2 switches the discharge period alternately between first period T1 and second period T2, to T1→T2→T1→T2→T1, and so on in every one period of the discharge period (every discharge period).

Figure 8:
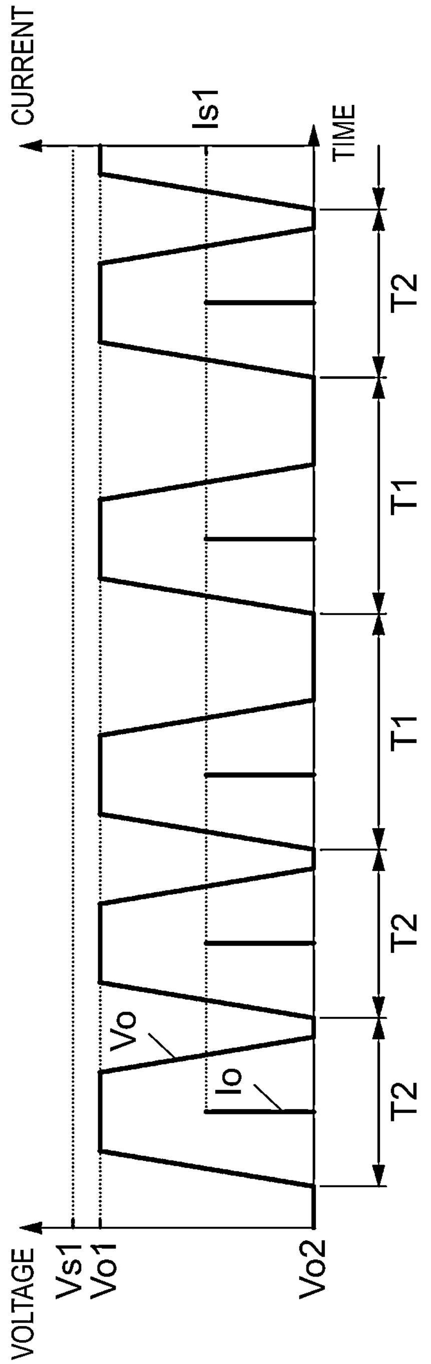
FIG. 8 is a graph schematically showing an output of a discharge device according to a first modification of the exemplary embodiment.

Voltage application circuit 2 may also alternately switch the discharge period between first period T1 and second period T2 in every plurality of periods of discharge periods (every plurality of discharge periods). For example, as shown in FIG. 8, voltage application circuit 2 may alternately switch the discharge period between first period T1 and second period T2 in every two periods of the discharge periods (every two discharge periods), to T1→T1→T2→T2→T1→T1→T2→T2, and so on.

(4) Second Modification

Voltage application circuit 2 may switch the discharge period to one of three or more periods with a lapse of time.

Figure 9:
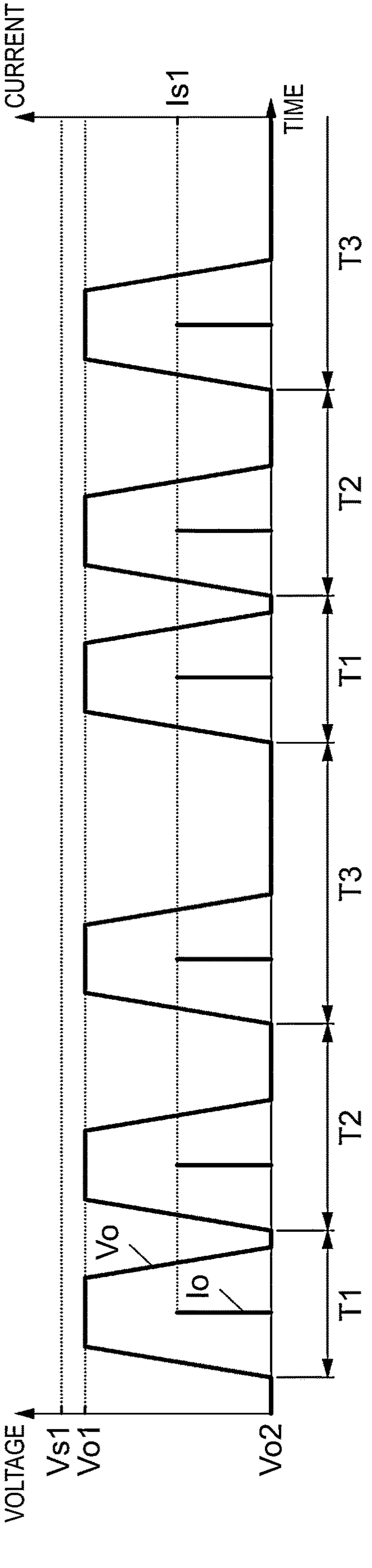
FIG. 9 is a graph schematically showing an output of a discharge device according to a second modification of the exemplary embodiment.

In the case where three periods T1, T2, T3 are used as the discharge period, for example, as shown in FIG. 9, voltage application circuit 2 may switch the discharge period in order of first period T1, second period T2, and third period T3, to T1→T2→T3→T1→T2→T3, and so on in every one period of the discharge period.

Voltage application circuit 2 may also switch the discharge period in order of first period T1, second period T2, and third period T3 in every period of the plurality of discharge periods. For example, voltage application circuit 2 may switch the discharge period to T1→T1→T2→T2→T3→T3→T1, and so on in every two periods of the discharge period.

Also in the present modification, the average of first period T1, second period T2, and third period T3 is preferably equal to the resonant period of liquid 50.

In addition, each of first period T1, second period T2, and third period T3 is preferably less than or equal to a first value, which is a value obtained by adding a half value of the resonant period to the resonant period, and larger than or equal to a second value, which is a value obtained by subtracting the half value from the resonant period. For example, when the resonant period is 2 msec, each of first period T1, second period T2, and third period T3 is selected from a range from 1 msec or more to 3 msec or less.

Note that four or more periods may be used as the discharge period.

(5) Third Modification

Voltage application circuit 2 preferably switches the discharge period to any one of the plurality of periods randomly.

Figure 10:
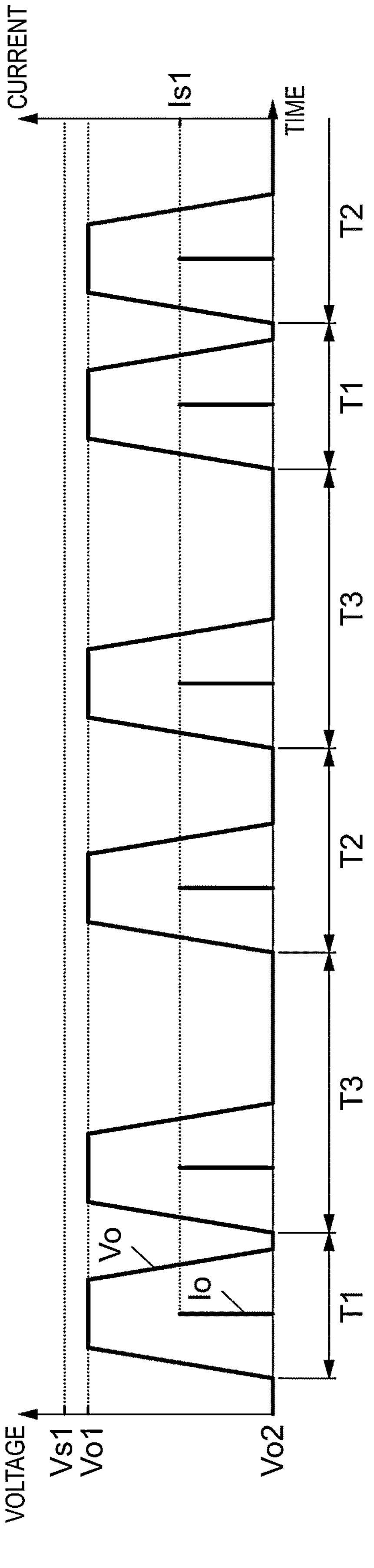
FIG. 10 is a graph schematically showing an output of a discharge device according to a third modification of the exemplary embodiment.

For example, as shown in FIG. 10, voltage application circuit 2 may randomly switch the discharge period to any one of first period T1, second period T2, and third period T3 in every one period of the discharge period. For example, voltage application circuit 2 includes a random number generator (random number generation function). Voltage application circuit 2 sets a period corresponding to the random number generated by the random number generator among first period T1, second period T2, and third period T3 as the next discharge period.

Also in the present modification, the average of first period T1, second period T2, and third period T3 is preferably equal to the resonant period of liquid 50.

In addition, each of first period T1, second period T2, and third period T3 is preferably less than or equal to a first value, which is a value obtained by adding a half value of the resonant period to the resonant period, and larger than or equal to a second value, which is a value obtained by subtracting the half value from the resonant period. For example, when the resonant period is 2 msec, each of first period T1, second period T2, and third period T3 is selected from a range from 1 msec or more to 3 msec or less.

Note that four or more periods may be used as the discharge period.

(6) Fourth Modification

Discharge by discharge electrode 41 and counter electrode 42 in the above-described exemplary embodiment is corona discharge, but discharge by discharge electrode 41 and counter electrode 42 is not limited to corona discharge.

For example, the discharge by discharge electrode 41 and counter electrode 42 may be discharge in which a phenomenon that corona discharge progresses to dielectric breakdown between discharge electrode 41 and counter electrode 42 is intermittently repeated (hereinafter, referred to as leader discharge). In the leader discharge, when voltage application circuit 2 operates in the first mode, output voltage Vo increases with a lapse of time, and local corona discharge at discharge electrode 41 progresses to cause dielectric breakdown, relatively large output current Io instantaneously flows. Immediately thereafter, voltage application circuit 2 operates in the second mode, output voltage Vo decreases, and output current Io is cut off. Thereafter, voltage application circuit 2 alternately repeats the first mode and the second mode as the operation modes, thereby repeating a series of processes of corona discharge→dielectric breakdown→discharge current→discharge interruption. That is, in the leader discharge, a discharge path is intermittently formed between discharge electrode 41 and counter electrode 42, and pulsed output current Io (discharge current) is repeatedly generated.

In the leader discharge as described above, radicals are generated at energy that is larger than energy in the corona discharge, and a large amount of radicals are generated that corresponds to approximately two to ten times the number of radicals generated in the corona discharge. The radicals generated in this manner constitute a basis for not only sterile filtration, odor removal, moisture keeping, freshness keeping, and virus inactivation, but also exerting useful effects in various situations. Here, when radicals are generated due to the leader discharge, ozone is also generated. However, while the leader discharge generates approximately two to ten times as many as radicals of the corona discharge, an amount of generated ozone is suppressed to a level similar to an amount of ozone in the corona discharge. Therefore, an amount of generated ozone is suppressed, while an amount of produced radicals is increased.

In general, when energy is input between a pair of electrodes to generate discharge, the discharge mode progresses from corona discharge to spark discharge, glow discharge, or arc discharge according to an amount of the input energy.

The corona discharge is discharge that locally occurs in one electrode, and is discharge without dielectric breakdown between the pair of electrodes (for example, discharge electrode 41 and counter electrode 42). The spark discharge, the glow discharge, and the arc discharge are discharge with dielectric breakdown between the pair of electrodes. The spark discharge is discharge in which a discharge path is instantaneously (singly) formed. In the glow discharge and the arc discharge, while energy is input between the pair of electrodes, a discharge path formed due to dielectric breakdown is maintained, and a discharge current is continuously generated between the pair of electrodes. If a capacity per unit time of a current that can be supplied between the pair of electrodes from a power supply (for example, voltage application circuit 2) is sufficiently large, a discharge path that has been formed once is maintained without interruption, and corona discharge develops into spark discharge, glow discharge, or arc discharge.

On the other hand, although the leader discharge accompanies the dielectric breakdown between the pair of electrodes, the dielectric breakdown is generated not continuously but intermittently. Therefore, a discharge current generated between the pair of electrodes is intermittently generated. That is, by decreasing the voltage applied between the pair of electrodes as soon as the corona discharge progresses to the dielectric breakdown, the discharge path is interrupted and the discharge is stopped. By repeating such generation and stop of the discharge, a discharge current intermittently flows between the pair of electrodes. As described above, the leader discharge repeats a high discharge energy state and a low discharge energy state. In this respect, the leader discharge is different from the spark discharge in which dielectric breakdown instantaneously (singly) occurs, and the glow discharge and the arc discharge in which dielectric breakdown continuously occurs (stated another way, the discharge current is continuously generated).

In particular, by discharge electrode 41 and counter electrode 42 configured as (2.1.1) described above, a place where distance W1 (see FIG. 3B) in counter electrode 42 to distal end part 411 is the shortest is edge 425 having an annular shape. Therefore, a discharge path between discharge electrode 41 and counter electrode 42 is easily generated between edge 425 having an annular shape and distal end part 411. That is, electric field concentration is easily generated at edge 425 having the annular shape of counter electrode 42. As a result, discharge that forms a discharge path extending in a conical side surface shape connecting edge 425 of counter electrode 42 and distal end part 411 of discharge electrode 41 (hereinafter, referred to as round discharge) is likely to be stably generated. In the round discharge, a discharge path between discharge electrode 41 and counter electrode 42 is a path from distal end part 411 to edge 425 having the annular shape, that is, a path along a side surface of a cone extending from a point to an annular ring.

Discharge by discharge electrode 41 and counter electrode 42 may also be round discharge (hereinafter, referred to as round leader discharge) in which dielectric breakdown is intermittently generated. The round leader discharge has advantages of both leader discharge and round discharge. In the round leader discharge, by widening the discharge path in a conical side surface shape, it is possible to prevent electric field concentration from rapidly growing and progressing to complete path breakdown discharge, and to spatially spread partial breakdown discharge. That is, in the round leader discharge, the generation amount of the active component can be further increased.

In addition, in each of the leader discharge, the round discharge, and the round leader discharge described above, it is preferable to form a discharge path with partial dielectric breakdown between discharge electrode 41 and counter electrode 42. In this case, the discharge path includes a first dielectric breakdown region formed around discharge electrode 41, and a second dielectric breakdown region formed around counter electrode 42. That is, a discharge path whose dielectric breakdown is partially (locally) formed rather than entirely is formed between discharge electrode 41 and counter electrode 42. The term “dielectric breakdown” used in the present disclosure means that electrical insulation of an insulator (including a gas) that isolates conductors from each other is broken, and an insulation state cannot be maintained. The dielectric breakdown of the gas occurs, for example, because ionized molecules are accelerated by an electric field, collide with other gas molecules, and ionize, and an ion concentration rapidly increases to generate gas discharge. In short, in the discharge path in which dielectric breakdown occurs partially (locally), dielectric breakdown is caused only partially, i.e., in a part in a gas (air) existing on the path connecting discharge electrode 41 and counter electrode 42. That is, it is preferable that the discharge path formed between discharge electrode 41 and counter electrode 42 is a path not completely broken, but partially and dielectrically broken. Even in the case of the discharge path including a part dielectrically broken (discharge path including a part not dielectrically broken) as described above, a current flows through the discharge path between discharge electrode 41 and counter electrode 42 to cause discharge. A discharge in a mode where the discharge path including a part dielectrically broken is formed as described above will be referred to as "partial breakdown discharge". In this partial breakdown discharge, edge 425 is preferably configured to have a shape connecting bottom wall 4211 and protrusion 423 with a curved surface having an arcuate cross section. Since edge 425 is a curved surface, partial breakdown discharge is likely to occur.

In the partial breakdown discharge described above, radicals are generated with higher energy in comparison with the corona discharge, and a large amount of radicals are generated that corresponds to approximately two to ten times the number of radicals generated in the corona discharge. The radicals generated in this manner constitute a basis for not only sterile filtration, odor removal, moisture keeping, freshness keeping, and virus inactivation, but also exerting useful effects in various situations. Note herein that ozone is also generated when radicals are generated by a partial breakdown discharge. However, while the partial breakdown discharge generates approximately two to ten times as many as radicals of the corona discharge, an amount of generated ozone is suppressed to a level similar to an amount of ozone in the corona discharge.

In addition to the partial breakdown discharge, there is a discharge developed from the corona discharge and in which a discharge path where continuous dielectric breakdown (complete path breakdown) is generated between discharge electrode 41 and counter electrode 42 (discharge path in which dielectric breakdown is continuously generated from discharge electrode 41 to counter electrode 42) is formed. The discharge in this mode will be hereinafter referred to as "complete path breakdown discharge"). In the complete path breakdown discharge, the phenomenon is repeated in which relatively large output current Io (discharge current) instantaneously flows when the corona discharge progresses to the complete path breakdown, output voltage Vo decreases immediately after that to cut off output current Io, and output voltage Vo increases to reach the dielectric breakdown. In the complete path breakdown discharge, radicals are generated with higher energy in comparison with the corona discharge, and a large amount of radicals are generated that corresponds to approximately two to ten times the number of radicals generated in the corona discharge, similarly to the partial breakdown discharge. However, energy of the complete path breakdown discharge is higher than energy of the partial breakdown discharge. Therefore, even if a large amount of radicals are generated in accordance with disappearance of ozone and an increase of radicals in a state of a "medium" energy level, the energy level becomes "high" in a subsequent reaction path. In this case, a part of radicals may disappear.

In other words, in the complete path breakdown discharge, since the energy related to the discharge is too high, a part of the generated active component may disappear, leading to a decrease in the generation efficiency of the active component. As a result, by adopting the partial breakdown discharge, it is possible to improve the generation efficiency of the active component as compared with the case of adopting the complete path breakdown discharge.

As described above, in discharge device 10, discharge between the pair of electrodes (for example, discharge electrode 41 and counter electrode 42) is not limited to corona discharge, and may be leader discharge, round discharge, or round leader discharge.

In the leader discharge, a discharge path is intermittently formed between a pair of electrodes, and a discharge current (output current Io) is intermittently and repeatedly generated.

The round discharge forms a discharge path extending in a conical side surface shape connecting the pair of electrodes.

In the round leader discharge, a discharge path extending in a conical side surface shape connecting the pair of electrodes is intermittently formed, and a discharge current (output current Io) is intermittently and repeatedly generated.

In addition, each of the leader discharge, the round discharge, and the round leader discharge may be either partial breakdown discharge or complete path breakdown discharge.

In the partial breakdown discharge, a discharge path with partial dielectric breakdown between the pair of electrodes is formed.

In the complete path breakdown discharge, a discharge path in which a continuous dielectric breakdown is generated between the pair of electrodes (a discharge path in which a dielectric breakdown is continuously generated from one electrode to the other electrode) is formed.

(7) Other Modifications

The shape of counter electrode 42 is not limited to the shape in the above-described exemplary embodiment, and may be any shape as long as discharge is generated between counter electrode 42 and discharge electrode 41. For example, counter electrode 42 may include a needle-shaped projection and may be configured to generate a dielectric breakdown region between the needle-shaped projection and discharge electrode 41.

Liquid supply unit 5 for generating charged fine particle liquid may be eliminated from discharge device 10. In this case, discharge device 10 generates a partial breakdown discharge generated between discharge electrode 41 and counter electrode 42 to generate air ions. In this configuration, air ions are included in the active component.

In addition, liquid supply unit 5 is not required to have the configuration in which discharge electrode 41 is cooled to generate dew condensation water on discharge electrode 41 as in the above-described exemplary embodiment. Liquid supply unit 5 may be configured to supply liquid 50 from a tank to discharge electrode 41 by using a capillary phenomenon or a supply mechanism such as a pump, for example. Moreover, liquid 50 is not limited to water (including dew condensation water), and may be a liquid other than water.

Voltage application circuit 2 may also be configured to apply output voltage Vo between discharge electrode 41 and counter electrode 42 with discharge electrode 41 as a positive electrode (plus) and counter electrode 42 as a negative electrode (ground). Moreover, only a potential difference (voltage) is required to be generated between discharge electrode 41 and counter electrode 42. Accordingly, voltage application circuit 2 may designate a high potential side electrode (positive electrode) as the ground, and a low potential side electrode (negative electrode) as negative potential to apply a negative voltage to load 4. That is, voltage application circuit 2 may designate discharge electrode 41 as the ground, and counter electrode 42 as negative potential, or may designate discharge electrode 41 as negative potential and counter electrode 42 as the ground.

Voltage application device 1 may also include a limiting resistor between voltage application circuit 2 and discharge electrode 41 or counter electrode 42. The limiting resistor is a resistor for limiting a peak value of output current Io (discharge current) flowing after dielectric breakdown in partial breakdown discharge. For example, the limiting resistor is electrically connected between voltage application circuit 2 and discharge electrode 41, or between voltage application circuit 2 and counter electrode 42.

In addition, a specific circuit configuration of voltage application device 1 may be modified as appropriate. For example, voltage application circuit 2 is not limited to a separately-excited converter, and may be a self-excited converter. Voltage generation circuit 22 may also be implemented with a transformer (piezoelectric transformer) having a piezoelectric element.

In addition, the waveform of output voltage Vo applied between discharge electrode 41 and counter electrode 42 by voltage application circuit 2 is not limited to the waveforms shown in FIG. 6A, and FIG. 8 to FIG. 10. Output voltage Vo may have a triangular waveform that gradually increases, and then decreases as soon as the discharge path is formed and output current Io (discharge current) flows.

Counter electrode 42 may also be eliminated from discharge device 10. In this case, discharge is generated between discharge electrode 41 and a member (for example, a housing) that is present around discharge electrode 41. Moreover, both liquid supply unit 5 and counter electrode 42 may be eliminated from discharge device 10.

Functions similar to voltage application device 1 described above may also be embodied as a control method of voltage application circuit 2, a computer program, a recording medium in which the computer program is recorded, or the like. That is, the function of voltage application circuit 2 may be embodied by a method of controlling voltage application circuit 2, a computer program, a recording medium recording the computer program, or the like.

In addition to the electrostatic atomization device, discharge device 10 may be an ion generator or the like.

(8) Conclusion

Discharge device (10) according to a first aspect of the exemplary embodiment described above includes voltage application circuit (2) that applies output voltage (Vo) to load (4) including discharge electrode (41) holding liquid (50) to generate discharge in discharge electrode (41). Voltage application circuit (2) includes a function of varying a magnitude of output voltage (Vo), and a function of switching a discharge period that is a period for varying the magnitude of output voltage (Vo) to any one of a plurality of periods (T1, T2, T3) having different lengths from each other with a lapse of time.

Discharge device (10) described above can reduce a discharge sound.

In discharge device (10) according to a second aspect of the exemplary embodiment described above, in the first aspect, the average of the plurality of periods (T1, T2, T3) is preferably included within a predetermined range including a resonant period in which the amplitude of the vibration of liquid (50) caused by the variation of output voltage (Vo) is maximized.

Discharge device (10) described above can reduce the discharge sound while suppressing the decrease in the generation amount of the active component.

In discharge device (10) according to a third aspect of the exemplary embodiment described above, in the first or the second aspect, each of the plurality of periods (T1, T2, T3) is preferably less than or equal to a first value and larger than or equal to a second value, the first value being a value obtained by adding, to a resonant period at which an amplitude of vibration of liquid (50) caused by output voltage (Vo) periodically varying is maximized, a half value of the resonant period, the second value being a value obtained by subtracting the half value from the resonant period.

Discharge device (10) described above can reduce the discharge sound while further suppressing the decrease in the generation amount of the active component.

Discharge device (10) according to a fourth aspect of the exemplary embodiment described above preferably further includes, in any one of the first to third aspects, liquid supply unit (5) that supplies liquid (50) to discharge electrode (41).

In discharge device (10) described above, since liquid (50) is automatically supplied to discharge electrode (41), it is not necessary for a person to supply liquid (50) to discharge electrode (41).

In discharge device (10) according to a fifth aspect of the exemplary embodiment described above, in any one of the first to fourth aspects, liquid (50) is preferably electrostatically atomized by discharge.

Discharge device (10) described above can generate a charged fine particle liquid containing radicals. Therefore, lives of radicals can be elongated as compared with a case where radicals alone are released into the air. Moreover, when the charged fine particle liquid has a nanometer size, for example, the charged fine particle liquid can be suspended in a relatively wide range.

In discharge device (10) according to a sixth aspect of the exemplary embodiment described above, in any one of the first to fifth aspects, voltage application circuit (2) preferably switches the discharge period to any one of the plurality of periods (T1, T2, T3) every time the discharge period is repeated a predetermined number of times.

Discharge device (10) described above can reduce a discharge sound.

In discharge device (10) of a seventh aspect according to the exemplary embodiment described above, in any one of the first to fifth aspects, voltage application circuit (2) preferably randomly switches the discharge period to any one of the plurality of periods (T1, T2, T3).

Discharge device (10) described above can reduce a discharge sound.

REFERENCE MARKS IN THE DRAWINGS

10 discharge device
2 voltage application circuit
4 load
41 discharge electrode
5 liquid supply unit
50 liquid
Vo output voltage
T1, T2, T3 period

The invention claimed is:

1. A discharge device comprising:

a voltage application circuit programmed to:

apply an output voltage to a load including a discharge electrode holding a liquid to cause the discharge electrode to generate electrical discharge, vary a magnitude of the output voltage to increase and then decrease in one discharge period, and switch a discharge period to any one of a plurality of periods different from each other based on a lapse of time, the discharge period being a period from a time at which the magnitude of the output voltage starts increasing to a time at which the magnitude starts increasing again.

2. The discharge device according to claim 1, wherein the plurality of periods are programmed to have an average included in a predetermined range including a resonant period at which an amplitude of vibration of the liquid caused by variation of the output voltage is maximized.

3. The discharge device according to claim 1, wherein the plurality of periods are programmed to be individually less than or equal to a first value and larger than or equal to a second value, the first value is programmed to be a value obtained by adding, to a resonant period at which an amplitude of vibration of the liquid caused by the output voltage that periodically varies is maximized, a half value of the resonant period, and the second value is programmed to be a value obtained by subtracting the half value from the resonant period.

4. The discharge device according to claim 1, wherein the voltage application circuit is further programmed to:

cause a liquid supply unit to supply the liquid to the discharge electrode.

5. The discharge device according to claim 1, wherein the voltage application circuit is further programmed to:

atomize the liquid electrostatically by the discharge.

6. The discharge device according to claim 1, wherein the voltage application circuit is further programmed to:

switch the discharge period to any one of the plurality of periods every time the discharge period is repeated a predetermined number of times.

7. The discharge device according to claim 1, wherein the voltage application circuit is further programmed to:

randomly switch the discharge period to any one of the plurality of periods.

8. The discharge device according to claim 1, wherein the plurality of periods are programmed to include a first period having a first length and a second period having a second length different from the first length, and the voltage application circuit is further programmed to vary the magnitude of the output voltage during the first period, and varying the magnitude of the output voltage during the second period subsequent to the first period.

9. An electrostatic atomization device comprising a voltage application circuit;

a discharge electrode configured to hold a liquid; and a liquid supply unit configured to supply the liquid to the discharge electrode, wherein the voltage application circuit is programmed to:

apply an output voltage to the discharge electrode thereby electrostatically atomizing the liquid, vary a magnitude of the output voltage, and switch a discharge period to any one of a plurality of periods different from each other based on a lapse of time, the discharge period being a period from a time at which the magnitude of the output voltage starts increasing to a time at which the magnitude starts increasing again.

10. The electrostatic atomization device according to claim 9, wherein the plurality of periods are programmed to have an average included in a predetermined range including a resonant period at which an amplitude of vibration of the liquid caused by variation of the output voltage is maximized.

11. The electrostatic atomization device according to claim 9, wherein the plurality of periods are programmed to be individually less than or equal to a first value and larger than or equal to a second value, the first value is programmed to be a value obtained by adding, to a resonant period at which an amplitude of vibration of the liquid caused by the output voltage that periodically varies is maximized, a half value of the resonant period, and the second value is programmed to be a value obtained by subtracting the half value from the resonant period.

12. The electrostatic atomization device according to claim 9, wherein the voltage application circuit is further programmed to:

cause the liquid supply unit to supply the liquid to the discharge electrode.

* * * * *